United States Patent [19]
Winter

[11] 3,930,803
[45] Jan. 6, 1976

[54] ANTI-POLLUTION APPARATUS
[75] Inventor: Karl Winter, Dortmund, Germany
[73] Assignee: CEAG Concordia Elektrizitats-Aktiengesellschaft, Dortmund, Germany
[22] Filed: Sept. 23, 1974
[21] Appl. No.: 508,410

Related U.S. Application Data
[62] Division of Ser. No. 153,345, June 15, 1971, Pat. No. 3,853,985.

[30] Foreign Application Priority Data
June 19, 1970 Germany.............................. 2030153

[52] U.S. Cl........ 23/277 R; 23/277 C; 55/DIG. 10; 55/DIG. 30; 55/84; 55/287; 55/288; 55/466; 110/8 R; 423/210; 252/411 R
[51] Int. Cl.²...................... B01J 1/22; B01D 53/34
[58] Field of Search....... 23/277 R, 277 C; 423/210; 110/8 R, 119; 252/411 R; 55/84, 59, 159, 180, 302, 287, 288, 466, DIG. 10

[56] References Cited
UNITED STATES PATENTS
3,395,972  8/1968  Hardison ...................... 23/288 F X Primary Examiner—James H. Tayman, Jr.
Attorney, Agent, or Firm—Herbert L. Lerner

[57] ABSTRACT

Apparatus for purifying an air or gas flow of combustible vaporous or gaseous impurities by passing the air or gas through an adsorption filter and charging the filter to a predetermined level. After the filter is so charged, the air or gas flow is interrupted and the filter is desorbed by passing a heated inert gas generated by stoichiometric burning of hydrocarbons through the filter.

5 Claims, 1 Drawing Figure

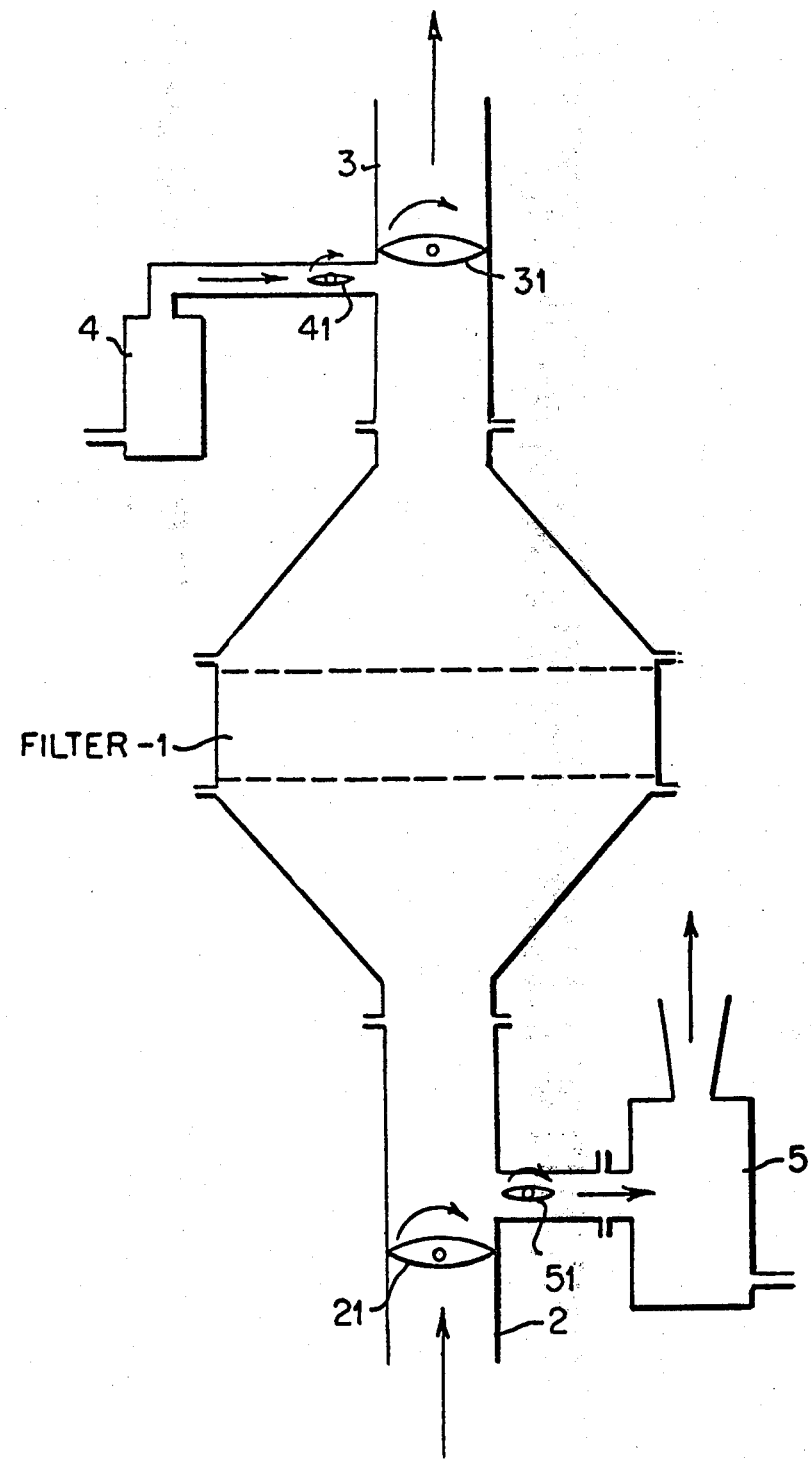

ANTI-POLLUTION APPARATUS

This is a division of application Ser. No. 153,345 filed June 15, 1971, now U.S. Pat. No. 3,853,985.

My invention relates to the minimization of pollutants in the air, and, more particularly to apparatus for purifying an air or gas flow of combustible vaporous or gaseous impurities or pollutants by means of adsorption filters.

Methods and apparatus are available for purifying the air or other carrier gases but are very difficult to operate or require an unjustifiable expense to remove or to destroy harmful gaseous or vaporous substances. Initially, it was attempted to dispose of these substances, which are emitted in large quantities, for instance, due to incomplete burning processes, by their rarefaction with atmosphere. Also, for instance, the expulsion of the impurities from stationary plants into higher air layers has been attempted. However, no fundamental solution of the problem was achieved, since a heavy rarefaction with the atmosphere or an expulsion into the higher air layers is acceptable in remote and windy areas, but not in calm areas, which are mostly densely populated, and where such air pollutants are created in huge quantities.

In order to control the most harmful portions of exhaust gases, as long as these pollutants are combustible gases and vapors, previously it was attempted either to separate them from the carrier gas by adsorption filters, such as, activated charcoal, or to pass them through an after-burner and to change them into harmless substances therein. For example, in the ideal case, pure hydrocarbons are burned and changed without residue into carbon dioxide and water. In this method, it was also attempted to lower the burning temperatures by utilization of catalysts. However, both of these methods have not resulted in achieving the desired aim, as in both cases, the disposal of the polluting gases or vapors is possible only with an enormous expense. The utilization of activated charcoal filters alone, for instance, is considered to be economically justifiable only if the concentration of the impurities does not exceed five milligrams per standard cubic meter, as the filtering substance is consumed too rapidly if the concentration of pollutants or impurities is higher. An afterburning of the combustible air pollutants in catalysts is economical only if the concentration of the above mentioned pollutants is not less than one hundred milligrams per standard cubic meter of air. For the heating of all substances used in the burning process to the required temperature of reaction, the concentration is even substantially higher.

However, in order to prevent unburned gaseous particles reaching the purified air side if the gaseous mixture temperatures are too low, an additional heating of the gas mixture follows to support the combustion process. Therefore, the exhaust gas heat was attempted to be used for the burning process in the heat exchanger, and for supplemental heat, an additional heating apparatus is available. However, such devices become so expensive, that the disposal of these mostly harmful or ill-smelling air pollutants in the present catalytic afterburning devices is not worthwhile if the concentration is lower than one hundred milligrams per cubic meter. Consequently, a satisfactory solution at present is not available for the removal of the combustible air pollutants from the air having a concentration range of between five and one hundred milligrams per standard cubic meter.

In order to remedy this problem, there has already been devised a process for purifying an air or gas flow of combustible vaporous or gaseous impurities by means of adsorption filters, wherein the air or gas flow is purified by means of an adsorption filter after being charged with a predetermined amount of combustible impurities. The filter is desorbed by a heated air flow in counterflow, the desorbate is burned in a catalytic afterburner, and a portion of the mixture of air and burned desorbate is repeatedly passed through the filter until the filter charge decreases to a level where the filter can again be used for purifying the air or gas flow. However, so-called catalyst poisons are created in this process, for instance, organic phosphorous compounds, and the device slowly becomes ineffective.

There is also already known a process, in which the gases are retained in the adsorption filter until the filter reaches its saturation level, then the adsorption filter is heated and the gases expelled therefrom and burned in a burning device or in the heated catalyst layer. Subsequently, the heat supply to the adsorption filter and to the burner or the catalyst layer is discontinued and the adsorption process is restarted. This method uses a concurrent flow, so that the harmful gas particles pass from the polluted air side to the purified air side of the repeatedly used activated charcoal filter and are not completely desorbed because the heated air flow is subject to cooling along its path of travel through the filter. As already known, the heating temperature has an upper limit of approximately 400°C because of the inflammability of the activated charcoal, which cannot be exposed to the influence of the oxygen present in the heated air at this temperature. Moreover, this process is inefficient because the entire air flow has to be heated, not only the necessary portion thereof.

An object of my invention is to provide apparatus for purifying an air or gas flow of combustible vaporous or gaseous impurities by means of adsorption filters, which eliminate the above drawbacks.

Another object of my invention is to provide such apparatus which is efficient and economical.

Yet another object of my invention is to provide such apparatus which lends itself to being easily automated.

Other objects, advantages and features of this invention will become more apparent from the following description.

These objects are achieved according to the principles of my invention in that the air or gas flow is purified by an adsorption filter, and after the charge of the filter with combustible impurities has reached a predetermined level, it is desorbed in counterflow by a hot inert gas generated by stoichiometric burning of hydrocarbons, and then the desorbate, carried away by the inert gas, is subsequently burned with an additional supply of air or oxygen. This method is utilized to advantage when the adsorption filter is saturated with impurities. Preferably, activated charcoal is used as the adsorption material, but also silica gel for adsorption of moisture and zeolites could also be used.

The invention will be further described with reference to embodiments thereof, illustrated by way of example on the accompanying drawing in which:

The FIGURE is a diagrammatic view of an embodiment of my invention for purifying the gas flow of impurities or pollutants.

Referring to the FIGURE my apparatus is shown including two burning chambers 4 and 5. The first burning chamber 4 is connected via a closing member to a gas discharge outlet on the purified air side and the second burning chamber 5 is connected via an another closing member to the gas supply inlet on the polluted air side of the adsorption zone or filter 1. The gas inlet and outlet can be closed by similar closing members. when the apparatus commences operation, only closing members 21 and 31 of the inlet 2 and the outlet 3 are open, so that the air or gas flow to be treated passes through the adsorption filter 1, which adsorbs the gaseous or vaporous impurities. Closing members 51 and 41, which are located behind the closing member 21 and before the closing member 31, respectively, in the direction of gas flow, are closed.

When the filter is charged by the impurities to a predetermined level, such as the saturation limit of the adsorption material with combustible impurities, the closing members 21 and 31 are closed and the closing members 41 and 51 are opened. An inert gas, generated in the first burning chamber 4 by stoichiometric burning of hydrocarbons and heated to a predetermined temperature, passes through the open closing member 41 and desorbs the adsorption filter 1 in counterflow. Subsequently, the inert gas enriched with the desorbate flows through the closing member 51 in the second burning chamber 5. An air or oxygen surplus is added to this mixture of inert gas and vaporous desorbate is produced in this burning chamber 5. The air or oxygen surplus is chosen so as to enable a complete burning of the desorbate.

The inert gas serving as carrying gas may be generated, for instance without excess air by burning oil or propane gas. For example, approximately 400 m³/h of inert gas are necessary to desorb 100 kg of vaporous impurities, stored in approximately one cubic meter of activated charcoal after purifying an air flow of approximately 10,000 m³/h having a harmful gases content of approximately 500 mg/³m. The inert gas is heated to a temperature of approximately 500°C after the moisturizing cooling, and is subsequently supplied to the burning devices.

After the adsorption filter is ready to resume its purifying function by utilization of the method according to the invention, the closing members 41 and 51 are closed and the gas to be cleaned is again subjected to a purification process by opening the closing members 21 and 31 so that the gas passed through the adsorption filter 1.

The present invention may be used for removing combustible, annoying or harmful vaporous of gaseous pollutants of the air or other gases. The concentration of these annoying or harmful impurities in their carrier gases is of a secondary importance influencing only the time required for desorbing to be completed. If a plurality of adsorption filters is used, it is possible to switch the gas flow to be treated from a saturated to a regenerated adsorption filter, and, consequently, a simultaneous adsorption of the impurities of the gas flow and a desorption of a filter previously charged with separated and adsorbed impurities can be conducted. The device according to the invention can also be automated, so that it does not need human control, if all the closing members are provided with a conventional remote control device, and the concentration and quantity of supplied air are continuously measured.

It will thus be seen that the objects set forth above, among those made apparent from the preceding description, are efficiently attained and, since certain changes may be made in the above apparatus and method without departing from the scope of the invention, it is intended that all matter contained in the above description and shown in the accompanying drawing shall be interpreted as illustrative and not in a limiting sense.

I claim:

1. Apparatus for purifying an air or gas flow of combustible vaporous or gaseous impurities comprising an adsorption chamber, an adsorption filter disposed in said adsorption chamber, inlet means in said adsorption chamber for the introduction of an air or gas flow of combustible vaporous or gaseous impurities for passage to one side of said filter permitting said air or gas to pass therethrough and charge said filter to a predetermined level, outlet means in said adsorption chamber for the discharge of said air or gas passing through said filter and leaving the side of the filter opposite the side of introduction of said air or gas, a first gas inlet closing member on the inlet side for introduction of said air or gas containing impurities and a second gas outlet closing member on the discharge side of said air and gas for blocking the flow of said air or gas, a first burning chamber outside said adsorption chamber for generating an inert gas, connecting means for introducing said inert gas into said adsorption chamber at a point between said gas outlet closing member and said opposite side of the filter, thereby passing said inert gas through said filter in a direction of flow opposite that of said air and gas to desorb said filter and a third inert gas flow closing member to block the flow of said inert gas.

2. Apparatus as set forth in claim 1 comprising said first and second closing members disposed in said inlet and outlet means, respectively, said first and second closing members being in an open position to permit the passage of said air or gas through said filter and a closed position when said filter is desorbed, said first burning chamber being connected with said outlet through said third closing member, a second burning chamber being connected with said inlet through a fourth closing member, said third and fourth closing members being closed when said air or gas passes through said filter and being open when said filter is desorbed.

3. Apparatus as set forth in claim 2, wherein said inert gas is generated in said first burning chamber, said first burning chamber comprising means for stoichiometrically burning a hydrocarbon.

4. Apparatus as set forth in claim 3, wherein a desorbate is produced when said filter is desorbed, said second burning chamber comprising means for supplying oxygen to completely burn said desorbate.

5. Apparatus as set forth in claim 1, wherein said filter comprises activated charcoal, silica gel or zeolite.

* * * * *